United States Patent
Anpat et al.

(10) Patent No.: US 9,253,081 B2
(45) Date of Patent: Feb. 2, 2016

(54) TRIGGER MESSAGE ROUTING ACCORDING TO A SERVICE CLASS

(71) Applicant: Cisco Technology, Inc., San Jose, CA (US)

(72) Inventors: Sourabh Anpat, London (GB); Mahbubul Alam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 350 days.

(21) Appl. No.: 13/678,261

(22) Filed: Nov. 15, 2012

(65) Prior Publication Data

US 2014/0136673 A1 May 15, 2014

(51) Int. Cl.
  *G06F 15/16* (2006.01)
  *H04L 12/707* (2013.01)
  *H04W 4/00* (2009.01)
  *H04W 4/14* (2009.01)
  (Continued)

(52) U.S. Cl.
  CPC ............... *H04L 45/24* (2013.01); *H04L 45/30* (2013.01); *H04W 4/005* (2013.01); *H04W 4/14* (2013.01); *H04W 76/022* (2013.01)

(58) Field of Classification Search
  CPC . H04L 67/12; H04L 12/2803; H04L 65/1073; H04L 12/66; H04L 51/18; H04L 51/38; H04L 12/2807; H04L 12/2816; H04L 12/5692; H04L 41/0803; H04W 76/02; H04W 60/00; H04W 84/18; H04W 48/18; H04W 4/005; H04W 4/02; H04W 4/22; H04W 8/06

USPC ............................ 455/435.1, 404.1, 521
  See application file for complete search history.

(56) References Cited

U.S. PATENT DOCUMENTS 7,684,787 B2 * 3/2010 Qu et al. .................... 455/412.1
7,733,845 B1    6/2010 Pearce et al.
(Continued)

FOREIGN PATENT DOCUMENTS

WO    WO-02054795 A2    7/2002
WO    WO-2011112683 A1  9/2011

OTHER PUBLICATIONS

Pettersson, et al., "Notification of Transmittal of the International Search Report and the Written Opinion of the International Searching Authority, or the Declaration", Patent Cooperation Treaty, International Application No. PCT/US2013/070266, mailed Feb. 20, 2014, 11 pages, European Patent Office, Rijswijk, Netherlands.

(Continued)

*Primary Examiner* — Brian J Gillis
*Assistant Examiner* — Kamran Mohammadi
(74) *Attorney, Agent, or Firm* — Parker Ibrahim & Berg LLC; James M. Behmke; Stephen D. LeBarron

(57) ABSTRACT

In one embodiment, a machine type communication (MTC) device can receive registration associated with a new device upon the new device registration for a computer network. The MTC device can further determine a machine-to-machine (MTM) service class for the new device based on the registration data with the service class associated with at least one network route for messages destined for the new device. The MTC device can further receive a trigger message destined for the device and route the trigger message according to the network route associated with the determined MTM service class.

11 Claims, 15 Drawing Sheets

(51) Int. Cl.
*H04W 76/02* (2009.01)
*H04L 12/725* (2013.01)

(56) References Cited

U.S. PATENT DOCUMENTS

| | | | |
|---|---|---|---|
| 8,244,244 B1 * | 8/2012 | Hietalahti et al. | 455/435.1 |
| 8,442,037 B2 | 5/2013 | Pearce et al. | |
| 8,472,405 B2 * | 6/2013 | Rune | 370/331 |
| 8,509,805 B2 * | 8/2013 | Anderson et al. | 455/456.1 |
| 2010/0057485 A1 | 3/2010 | Luft | |
| 2010/0183308 A1 | 7/2010 | Gerstel et al. | |
| 2011/0122774 A1 | 5/2011 | Hassan et al. | |
| 2011/0213871 A1 | 9/2011 | DiGirolamo et al. | |
| 2011/0265151 A1 | 10/2011 | Furlan et al. | |
| 2011/0265154 A1 | 10/2011 | Furlan et al. | |
| 2012/0102207 A1 | 4/2012 | Salowey et al. | |
| 2012/0196594 A1 | 8/2012 | Abhishek et al. | |
| 2012/0202508 A1 * | 8/2012 | Toth et al. | 455/450 |
| 2012/0252518 A1 | 10/2012 | Karampatsis et al. | |
| 2013/0188515 A1 * | 7/2013 | Pinheiro et al. | 370/254 |

OTHER PUBLICATIONS

Mobile Network Improvements for M2M, a 3GPP Perspective, ETSI M2M Workshop.

* cited by examiner

TABLE 1

| M2M SERVICE CLASS PRIORITIES | M2M SERVICE CLASS 1 | M2M SERVICE CLASS 2 | M2M SERVICE CLASS 3 | M2M SERVICE CLASS 4 |
|---|---|---|---|---|
| MOBILITY | NO | NO | YES | YES |
| SCHEDULING DELAY | TOLERANT | TOLERANT | BEST EFFORT | INTERACTIVE |
| REQUIRED DATA RATE | 10 KBPS | 100 KBPS | 1 MBPS | 10 MBPS |
| PERSISTENCE | NO | NO | NO | YES |
| PRIORITY | LOW | NORMAL | HIGH | LOW |

FIG. 6A

TABLE 2

| SERVICE CLASS | SIGNALING PATH | MTC APPLICATION |
|---|---|---|
| SERVICE CLASS 1 & 2 | SIGNALING PATH VIA SMS INFRASTRUCTURE | SMART METER |
| SERVICE CLASS 3 | SIGNALING PATH VIA PACKET CORE INFRASTRUCTURE - EMERGENCY SESSION | MOBILE HEALTHCARE - PERSONAL EMERGENCY RESPONSE SYSTEM |
| SERVICE CLASS 4 | SIGNALING PATH VIA PACKET CORE INFRASTRUCTURE | VIDEO BASED AFTERMARKET TELEMATICS |

FIG. 6B

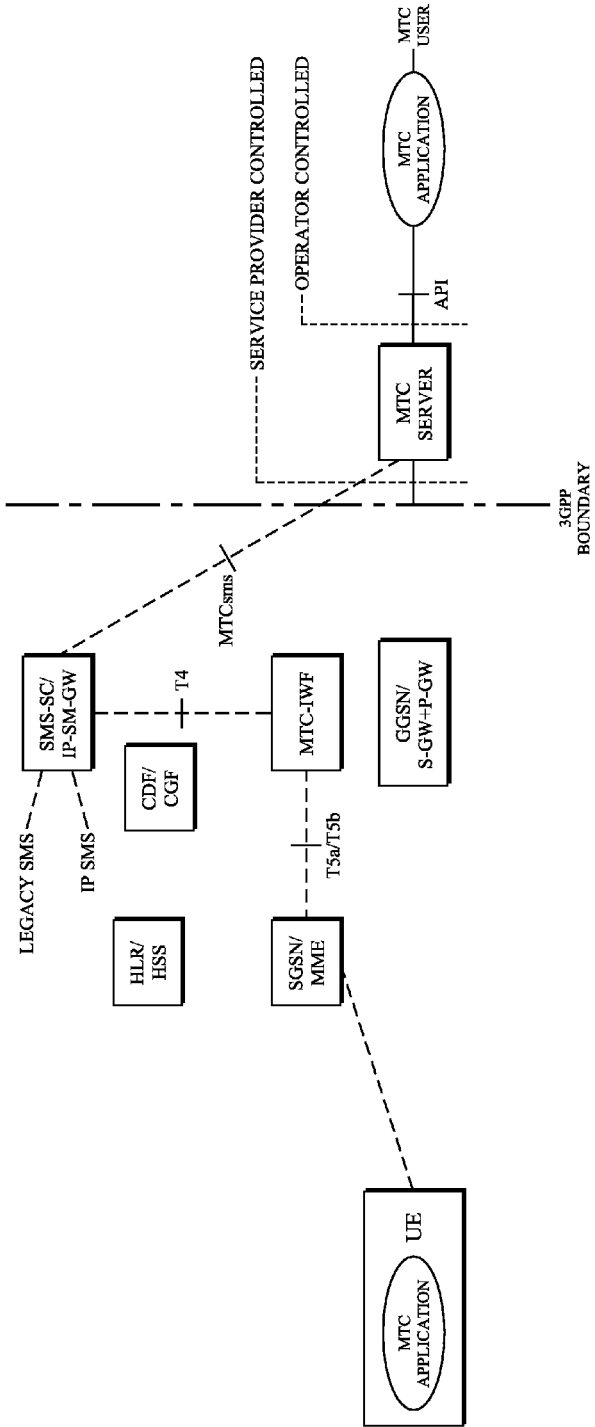
FIG. 7B

TRIGGER MESSAGE ROUTING ACCORDING TO A SERVICE CLASS

TECHNICAL FIELD

The present disclosure relates generally to computer networks, and, more particularly, to message routing for machine-type communications (MTC).

BACKGROUND

Increasingly, wireless personal communications are used to exchange electronic data such as voice, audio, video, emails, photos, etc. Demands for such ubiquitous communications drive development of advanced wireless technologies and systems such as the cognitive radio network (CRN), Third Generation Partnership Project (3GPP), Long Term Evolution-Advanced (LTE-Advanced) networks, and so on. In addition to the human-to-human (H2H) communications for the exchange of electronic data, emerging technologies also enable mechanical automation (e.g., the Internet of Things and the smart grid) and improve efficient electronic information exchange. Such communications among machine-type communications (MTC) devices are known as machine-to-machine (M2M) communications. M2M communications can be used in a is variety of areas (e.g., surveillance systems, backup of telephone landlines, asset tracking, navigation, traffic optimization, payment systems, remote monitoring, power systems, smart grid, industrial metering, etc.), can be implemented on a variety of networks, and can deliver business solutions in a cost-effective manner. However, distinct features in M2M communications create diverse challenges such as infrequent transmissions (e.g., MTC devices may send or receive data at possibly low duty cycles), small data transmissions (e.g., MTC devices may send/receive small amounts of data), group-based MTC communications, etc., which warrant special considerations.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 6A-6B illustrate tables of example service classes;

FIGS. 7A-7B illustrate schematic block diagrams of example signaling paths or network routes for one or more service classes;

DESCRIPTION OF EXAMPLE EMBODIMENTS

Overview

According to one or more embodiments of the disclosure, a node (e.g., a network device, a server, etc.) in a computer network can receive registration data associated with a prospective device and can further determine a machine-to-machine (MTM) service class for the prospective device based on the received registration data. The MTM service class may be associated with at least one network route for messages destined for the device. The node may receive a trigger message destined for the device and route the trigger message according to the network route associated with the determined MTM service class.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs) and even radio access networks (RANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. RANs are part of a mobile telecommunication infrastructure that implements radio access technologies. Conceptually, RANs reside between a user device (e.g., a client device) such as a mobile phone, a computer, or any remotely controlled machine and a core network (CN), which may include media gateways, mobile switching centers, serving GPRS support nodes (SGSN) and/or gateway GPRS support nodes (GGSN). RANs can include GSM radio access networks (GRAN), GERAN, which are the same as GRAN but specify the inclusion of EDGE packet radio services, UMTS radio access network (UTRAN), and LTE (Long Term Evolution) networks that include a high speed and low latency radio access network.

With respect to RANs, increasing mobile data usage motivated a 3rd generation partnership project (3GPP) to improve the LTE network and provide a stable environment for various telecommunication organizations to develop communication technologies. 3GPP networks, in part, support MTC device communications (e.g., machine-to-machine (MTM)).

Figure 1:
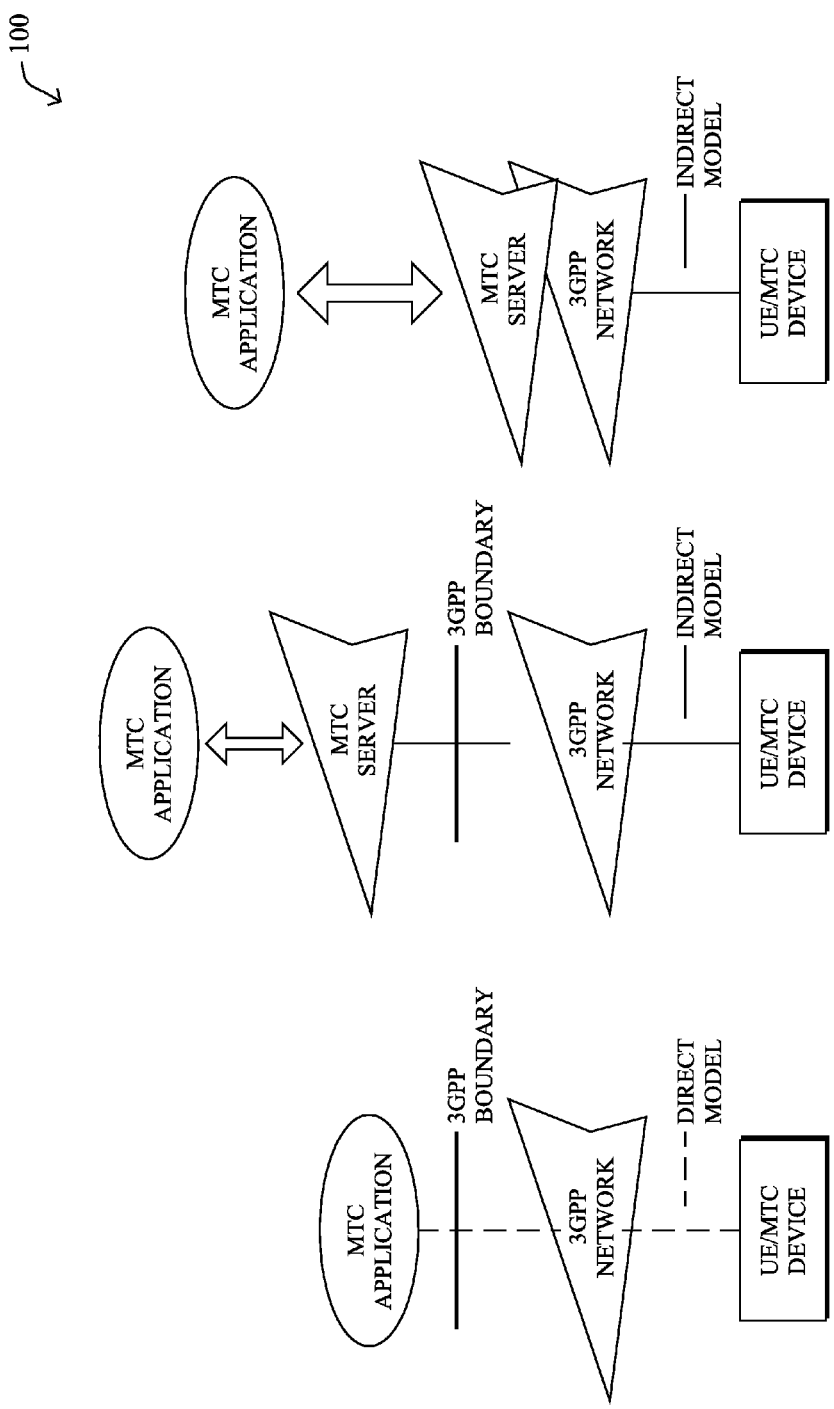
FIGS. 1A-1C illustrate example communication networks.

FIGS. 1A-1C illustrate schematic block diagrams of example MTC model networks (e.g., various 3GPP model networks). Notably, FIGS. 1A-1C illustrate "direct" and "indirect" network models. FIG. 1A is a schematic block diagram of an example direct model computer network 100, which illustratively comprises a machine type communication application (MTC Application), a 3GPP network, and various user equipment (UE) or MTC devices. According to the direct model, the MTC application communicates with the UE(s)/MTC devices directly as an over-the-top application on the 3GPP network.

Several sub models shown in FIGS. 1B-1C complement the network shown in FIG. 1A. For example, FIGS. 1B-1C highlight indirect MTC model networks (e.g., 3GPP model networks), in which the MTC application communicates with the UE(s) via services/interfaces provided in 3GPP networks. For example, in FIG. 1B, the MTC is application illustratively communicates with the UE(s) via the MTC server, which provides added services from a third party service provider (e.g., a provider outside the scope of the 3GPP network). In this fashion, the MTC server can communicate with the 3GPP network via an interface or a set of interfaces. Referring to FIG. 1C, the MTC server can be provided by the 3GPP (wherein the 3GPP operator becomes an effective service provider). In this fashion, the communication between the MTC server and the 3GPP network becomes internal to the Public Land Mobile Network (PLMN). Notably, the indirect models shown in FIGS. 1B-1C are not mutually exclusive to the direct model shown in FIG. 1A, which allows a 3GPP operator can combine the various direct and indirect models for different applications.

Figure 2:
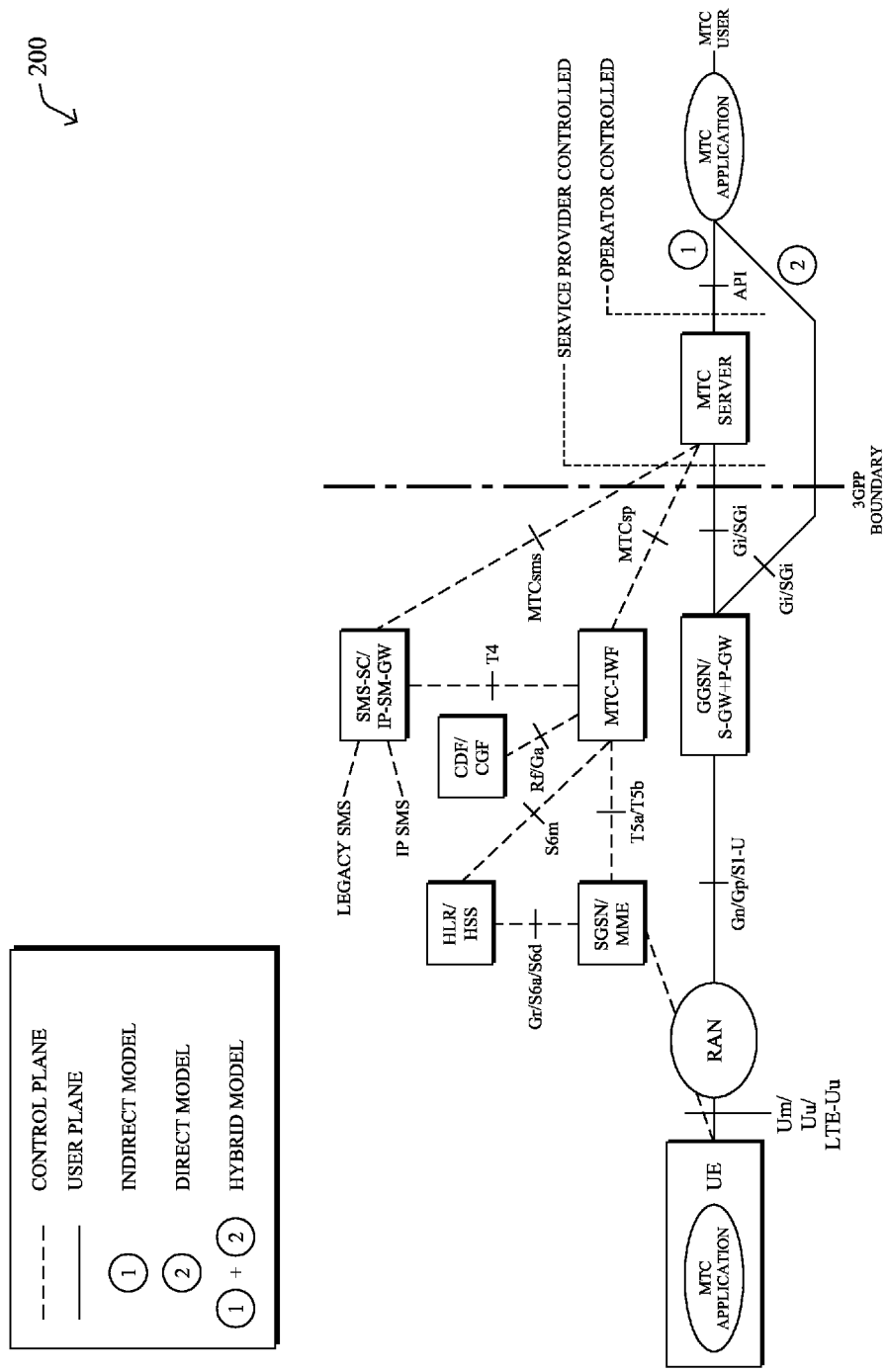
FIG. 2 illustrates an example network architecture.

FIG. 2 is a schematic block diagram of an example network architecture in more detail, denoted by reference number 200. Network 200 includes various MTC devices (e.g., MTC server, UE, etc.) and various interfaces (e.g., GGSN/S-GW+P-GW, MTC-IWF, SMS-SC/IP-SM-GW, etc.). Each of these devices and interfaces can be interconnected by various methods of communication. For instance, the links may be wired links or shared media (e.g., wireless links), as is understood by those skilled in the art. Those skilled in the art will also understand that any number of MTC devices, interfaces, links, etc. may be used in the computer network, and that the view shown herein is for simplicity. Also, those skilled in the art will further understand that while the network is shown in a certain orientation, but such orientation merely an example illustration that is not meant to limit the disclosure.

Still referring to FIG. 2, the MTC server can deliver a triggering message to a registered device (e.g., an MTC Device/UE) to wake it up and, for example, initiate communications, receive relevant information, etc. The MTC server may choose to deliver a triggering message for example, via the MTC-IWF interface and/or the GGSN/PGW. Default logic to choose a triggering delivery network for messages destined for the registered device is as follows: the SMS infrastructure is tried first, and if delivery fails, then the MTC server can route the trigger message via the GGSN/P-GW.

Figure 3:
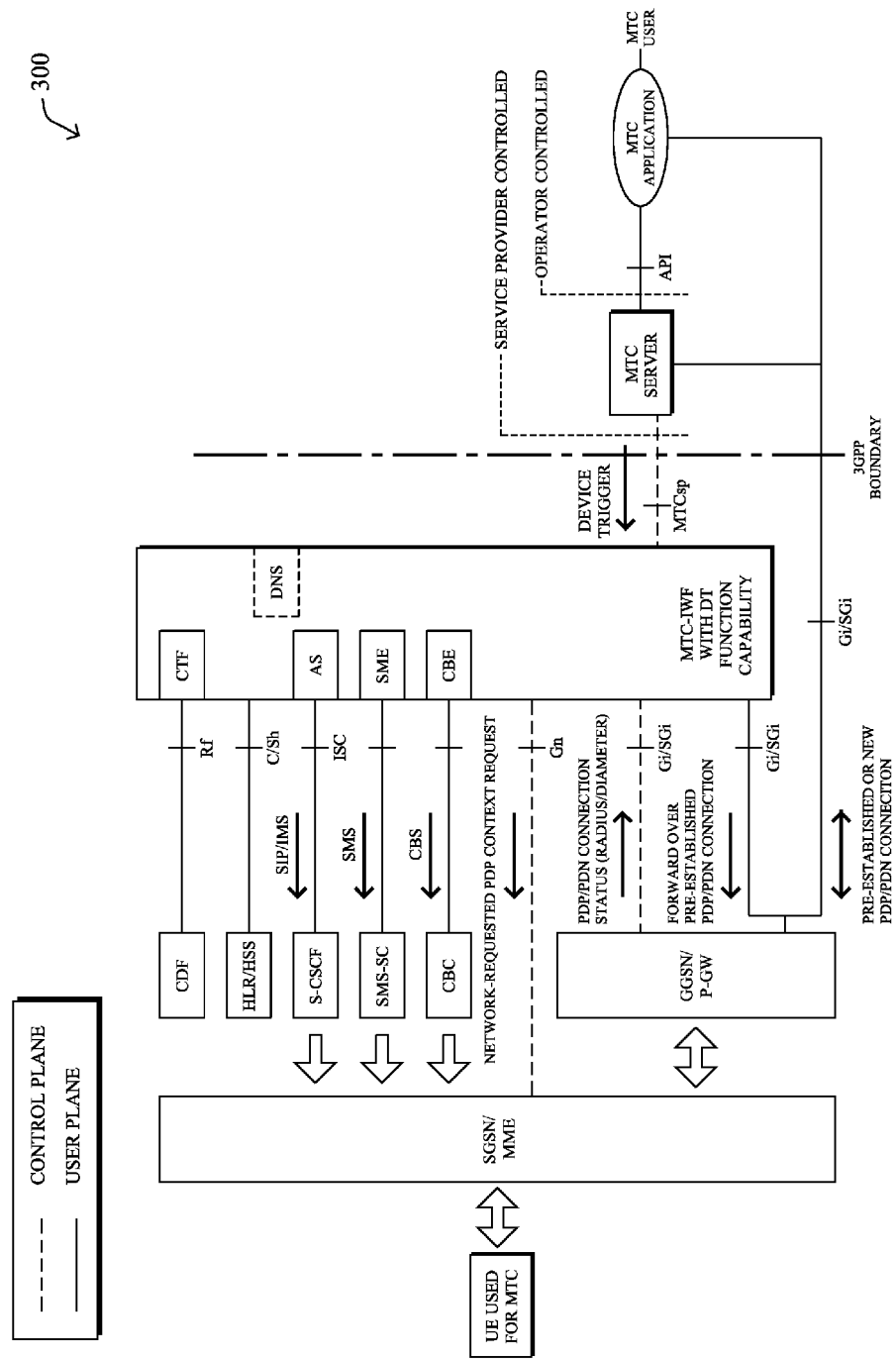
FIG. 3 illustrates an alternative example network architecture to that shown in FIG. 2.

FIG. 3 is an alternative view of a schematic block diagram of a network architecture, denoted by reference number 300. Network 300 is another view of network 200 (ref. FIG. 2) and additionally shows internal details of the MTC-IWF interface. As shown, the MTC server transmits a "device trigger" (e.g., a trigger message) via the MTCsp link to the MTC-IWF interface.

Figure 4:
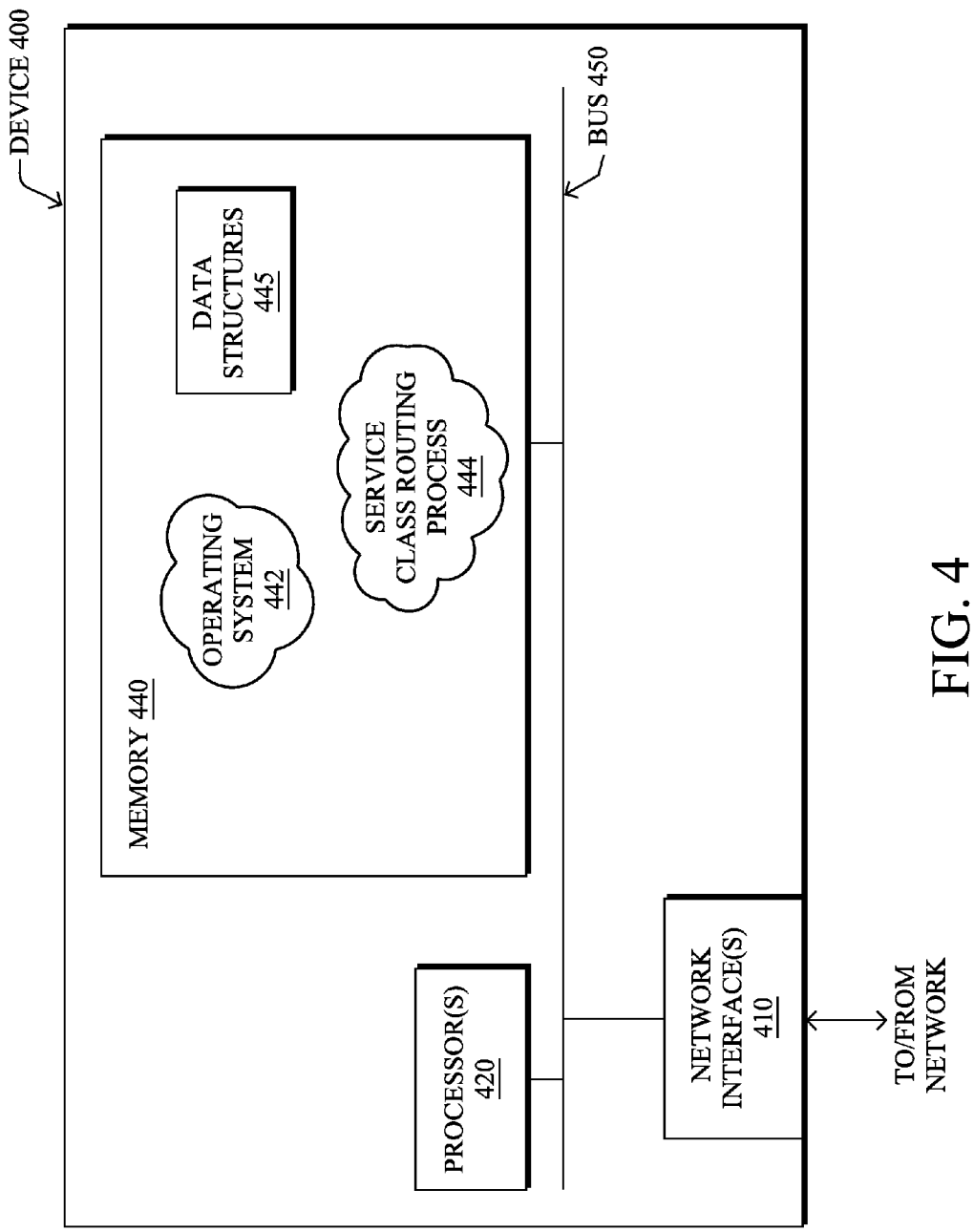
FIG. 4 illustrates an example network device/node.

FIG. 4 is a schematic block diagram of an example node/device 400 that may be used in one or more embodiments described herein (e.g., as a MTC device/UE or an MTC server, or a device used in conjunction with one or more of the interfaces shown in FIGS. 2-3 above). Device 400 may comprise one or more network interfaces 410 (e.g., wired, wireless, etc.), at least one processor 420, and a memory 440 interconnected by a system bus 450.

The network interface(s) 410 contain the mechanical, electrical, and signaling circuitry for communicating data over links coupled to the networks 100/200. The network interfaces may be configured to transmit and/or receive data using a variety of different communication protocols. Note, further, that the nodes may have two different types of network connections 410, e.g., wireless and wired/physical connections, and that the view herein is merely for illustration.

The memory 440 comprises a plurality of storage locations that are addressable by the processor 420 and the network interfaces 410 for storing software programs and data structures associated with the embodiments described herein. The processor 420 may comprise hardware elements or hardware logic adapted to execute the software programs and manipulate the data structures 445. An operating system 442, portions of which are typically resident in memory 440 and executed by the processor, functionally organizes the device by, inter alia, invoking operations in support of software processes and/or services executing on the device. These software processes and/or services may comprise an illustrative "service class routing" process/services 444, as described herein. Note that while service class routing process/services 444 is shown in centralized memory 440, alternative embodiments provide for the process to be specifically operated within the other components of the device, such as the network interfaces 410. Generally, service class routing process (services) 444 contains computer executable instructions executed by the processor 420 to perform functions provided by one or more routing protocols, as will be understood by those skilled in the art, and as modified by the techniques described herein.

For example, in one or more embodiments of the disclosure as described in detail below, the MTC server in a computer network can receive registration data associated with a device (e.g., a user equipment device) upon the device registration. The MTC server can further determine a machine-to-machine (MTM) service class for the registered device based on the received registration data. Notably, the MTM service class can be associated with at least one network route for messages destined for the device. When the MTC server receives a message (e.g., a trigger message) destined for the registered device, the MTC server can further route the message according to the network route associated with the MTM service class for the registered device.

Figure 5A:
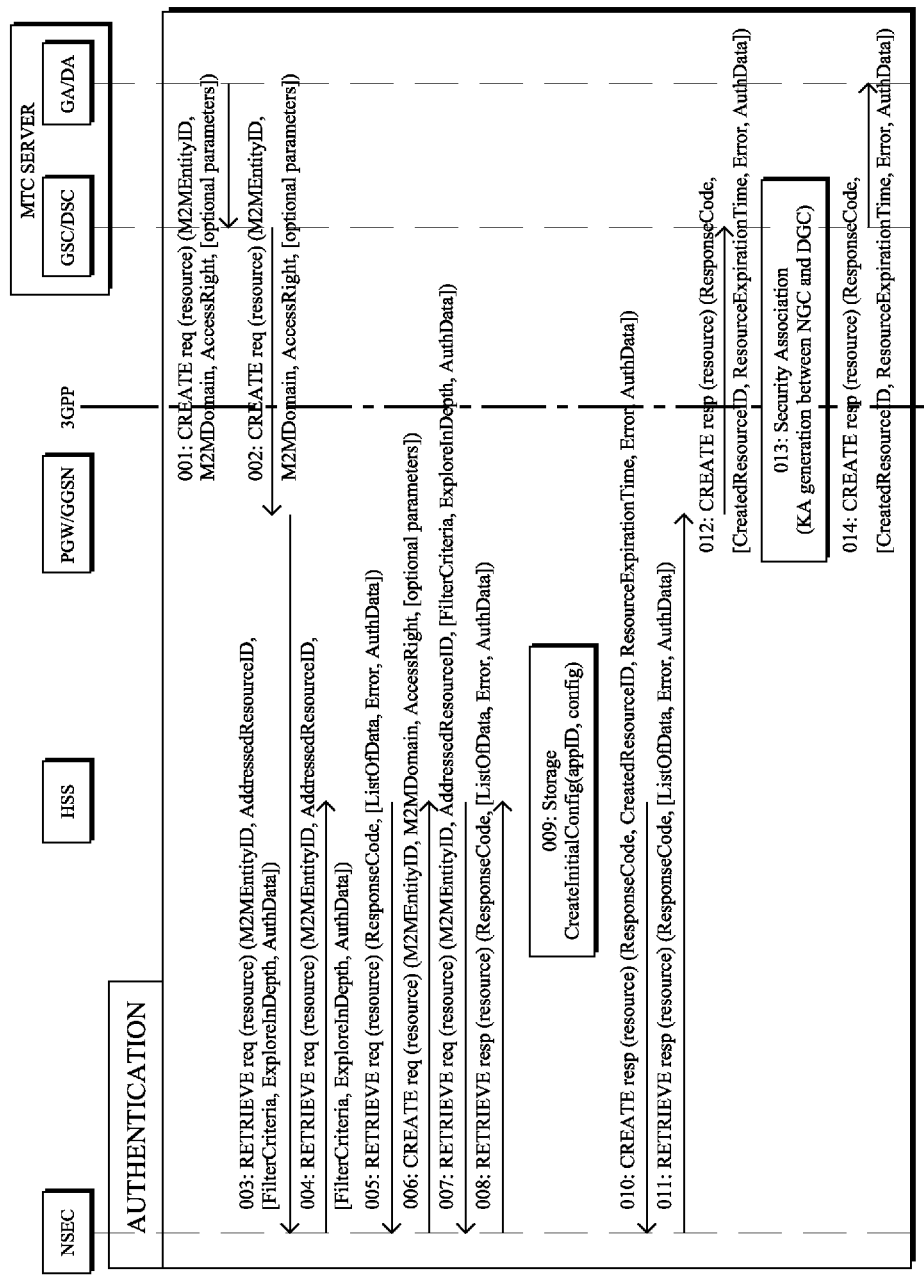
FIGS. 5A-5C illustrate examples of messages for device registration in the communication network.
Figure 5B:
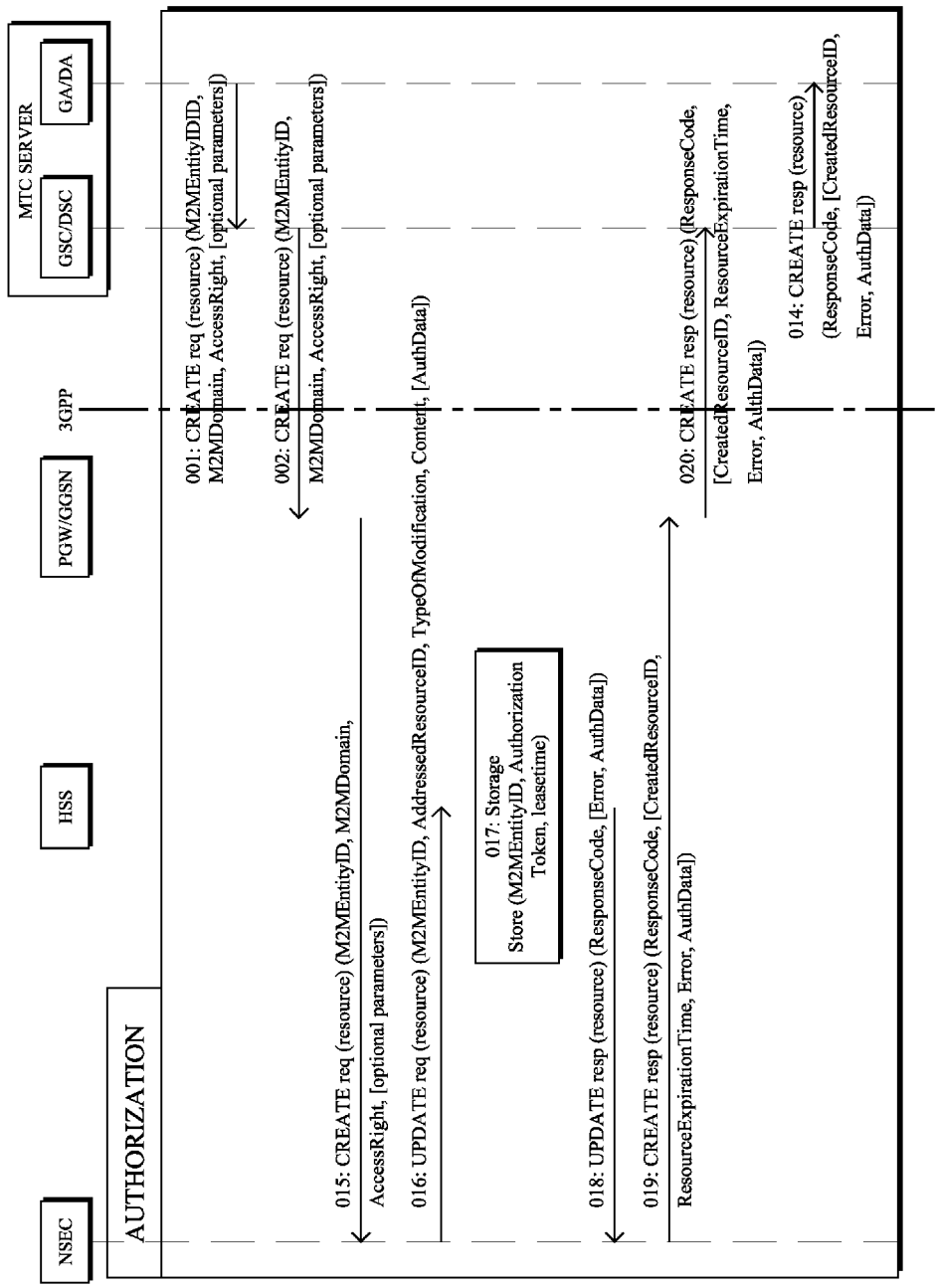
Figure 5C:
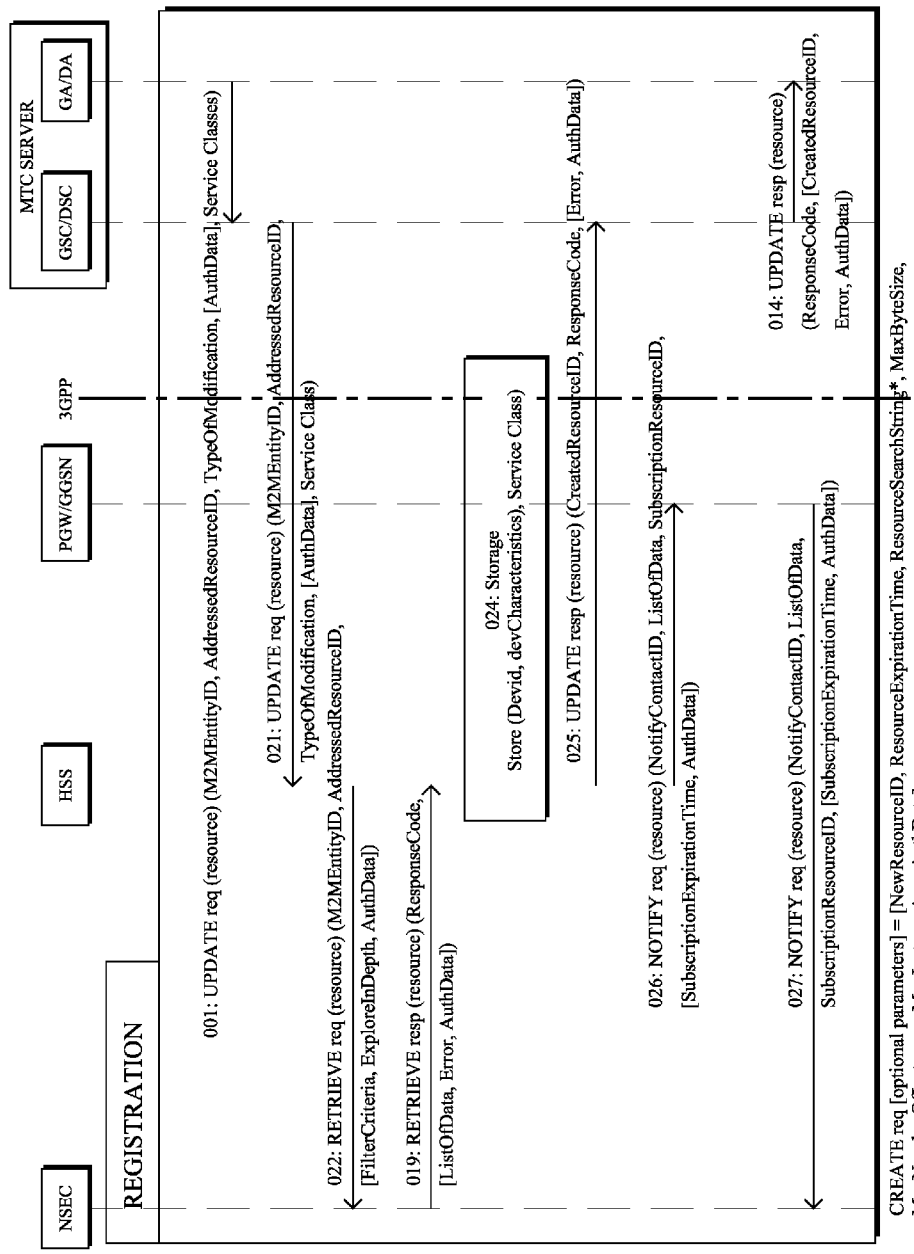

With respect to the device registration process (e.g., authentication, authorization, registration), FIGS. 5A-5C collectively illustrate examples of messages for device registration in the communication network, which can be implemented in, for example, the networks shown in FIGS. 2-3. Interface/device blocks located at the top of each of FIGS. 5A-5C correspond to various devices/interfaces shown in the networks of FIGS. 2-3. Notably, the dashed line between the PGW/GGSN block and the MTC Server block corresponds to the 3GPP boundary shown in FIGS. 2-3. Further, discussion of messages 001-027 herein refers to the collective arrangement of FIGS. 5A-5C. With respect to the network security capability (NSEC) (not shown in FIGS. 2-3), it performs mutual authentication and verifies an integrity validation status reported to/from a MTC Devices/UEs and triggers appropriate post validation actions—here, the registration process.

Referring to FIG. 5A and particularly to 001, the MTC device sends a registration request to a network generic communication interface (NGC), which in turn forwards the request to the NSEC. This requires authentication and interactions with an AAA (authentication, authorization, and accounting) server. Following successful authentication, a session key is delivered to NSEC and simultaneously derived at the MTC device. At 002, the DA (device application) contacts PGW/GGSN to setup a secure session. At 003, the PGW/GGSN contacts the NSEC to obtain an application key ($K_A$) for the specific application. At 004, the NSEC checks if the device application is already known by HSS capability. If the device application is already known by HSS capability, at 005, the HSS returns its device application identifier devID (step 010). If the device application is not known by HHS capability, the device application it instructs HSS to create it (006-010). For example, at 006, the NSEC requests from HSS the creation of a new entry for the device. From 007-008, HSS receives the default configuration for the DA from HSS (Home Subscription Server). At 009, the HSS stores the DA registration, and at 010 the create request returns a devID—that is generated by HSS. At 011, the NSEC returns the corresponding $K_A$ to the NGC and at 012, the application registration request result is returned to the DA. Subsequently, at 013, the PGW/GGSN and DA setup a security association using key $K_A$. The method to setup the security association can be FFS (For Further Study).

With particular respect to authorization shown in FIG. 5B, at 014-015 the DA contacts NGC, which then contacts NSEC for getting authorization to access the M2M core layer. At 016-018, the NSEC updates the DA profile, adding its Authorization Token and associated Lease Time. Notably, Lease-Time may be infinite for DA that cannot afford authorization expiration (i.e. eHealth use cases). At 019-020, the NSEC returns the Authorization Token and associated Lease Time to the NGC, which forwards it to the DA. After the Lease Time has expired, the DA is required to renew its Authorization Token by running the same exchanges described in above at 014-020.

FIG. 5C highlights registration or the process which can set an indication that the DA is reachable and online. With respect to registration, at 021, the DA updates its profile by issuing a single or multiple (as required) update request(s) to HSS. At 022-023, (upon receipt) the HSS validates the Authorization Token by contacting NSEC. At 024, the DA updates its profile, and at 025, the HSS returns the registration result to the DA. The profile, as shown at 024 may include one or more service class, which may be is associated with a particular network route as discussed in greater detail below. At 026, HSS informs PGW/GGSN regarding the DA being online and at 027, PGW/GGSN informs HSS about DA being online. Notably, the DA should de-register itself when it goes offline.

In sum, the MTM server can receive registration data shown collectively in FIGS. 5A-5C. Such registration data can include one of at least an MTM service class type, a device type, and/or a device property. Typically, the registration data is associated with a device (e.g., a user equipment device) upon the device registration. In some example embodiments, as is understood by those skilled in the art, the registering device can receive configuration parameters and based on the configuration parameters determine a particular MTM service class (e.g., selecting the particular MTM service class from one of a plurality of locally stored MTM service classes).

With respect to service classes discussed above (e.g., at 024 in FIG. 5C), the MTC server can also determine a machine-to-machine (MTM) service class for each registered device based on the received registration data. For example, FIG. 6A provides an example table showing example services classes (e.g., service classes 1-4), which can be determined for each MTC device. In particular, the table illustrates service classes created according to one or more device properties (e.g., mobility, scheduling delay, requiring data rate, persistence, priority, etc.). Such device properties serve as examples and may be used independently, or in one or more combinations. Further, such device properties are not limited to those shown, but instead can include any additional device properties, as understood by those skilled in the art.

FIG. 6B provides another table that illustrates service classes shown in FIG. 6A further associated with one or more network routes (e.g., signaling paths). Moreover, the table in FIG. 6B shows an association or assignment of the network routes for each service class according to a particular MTC application (e.g., smart meter, mobile healthcare, video based aftermarket telematics, etc.). While FIG. 6A illustrates service classes (e.g., MTM service classes) determined according to one or more device properties, FIG. 6B illustrates network routes for each service class determined according is to one or more device applications. As is understood by those skilled in the art, creating service classes and assigning network routes for each service class can be based on the device properties of FIG. 6A as well as the device applications of FIG. 6B. That is, the characteristics of FIGS. 6A-6B may be interchangeable for both creating service classes and/or network routes.

Figure 7A:
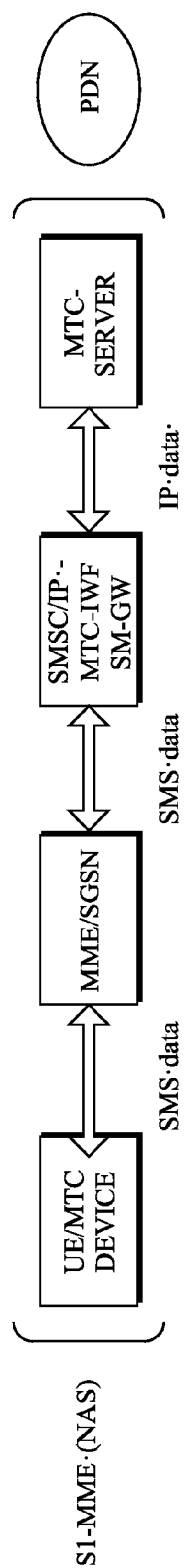

FIGS. 7A-7B illustrate schematic block diagrams of example signaling paths or network routes for one or more service classes—here service classes 1 and 2—via, for example the SMS infrastructure. As discussed above, the machine-to-machine (MTM) service class is determined for the device (e.g., based on received registration data) and each service class can be further associated with at least one network route for messages destined for the device (e.g., ref Table 2). Once associated, messages received by, for example, the MTC server, can be routed according to the network route. FIGS. 7A-7B particularly show the various network devices and interfaces needed to route a message (e.g., a trigger message) from the MTC server to the UE/MTC device. Notably, the trigger message, when received by the UE/MTC device, can cause the UE/MTC device to wake up and transmit data.

Figure 8A:
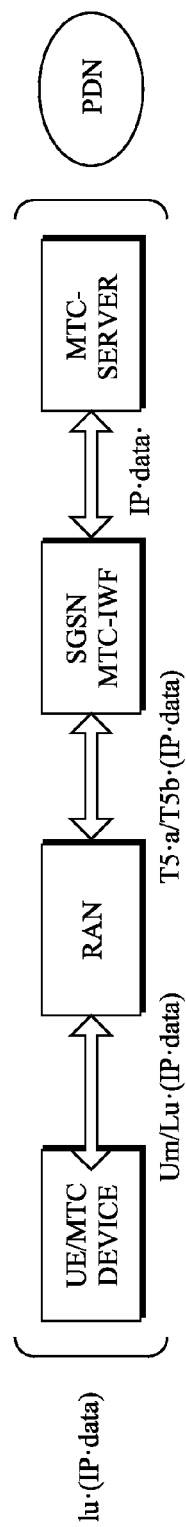
FIGS. 8A-8B illustrate schematic block diagrams of additional example signaling paths or network routes for one or more service classes.
Figure 8B:
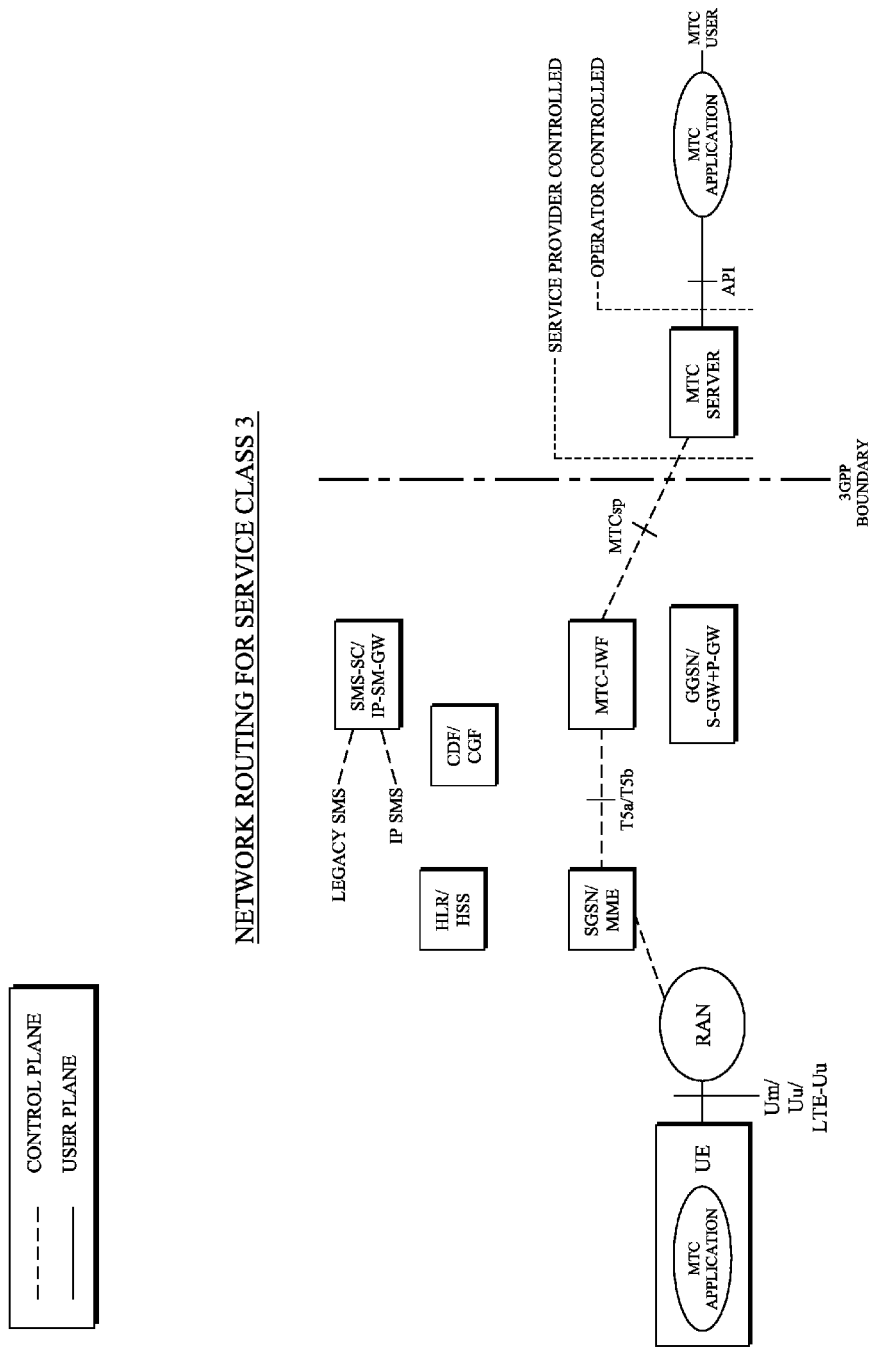

FIGS. 8A-8B illustrate schematic block diagrams of example signaling paths or network routes for one or more service classes—here service class 3—via, for example the packet core infrastructure used for an emergency session. As shown, network messages destined for the UE/MTC device assigned to service class 3 can be routed via the SGSN MTC-IWF interface, to the RAN to the UE/MTC device. In this fashion, the network route for service class 3 can include a packet core route. Further, the packet core route can include at least one Gateway Packet Radio Service (GPRS) support node (GGSN).

Figure 9A:
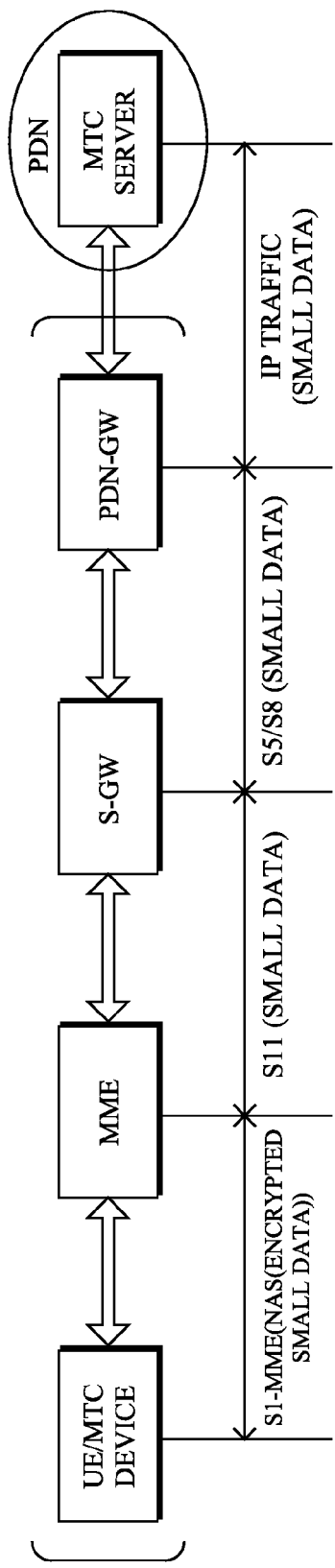
FIGS. 9A-9B illustrate schematic block diagrams of additional example signaling paths or network routes for one or more service classes.
Figure 9B:
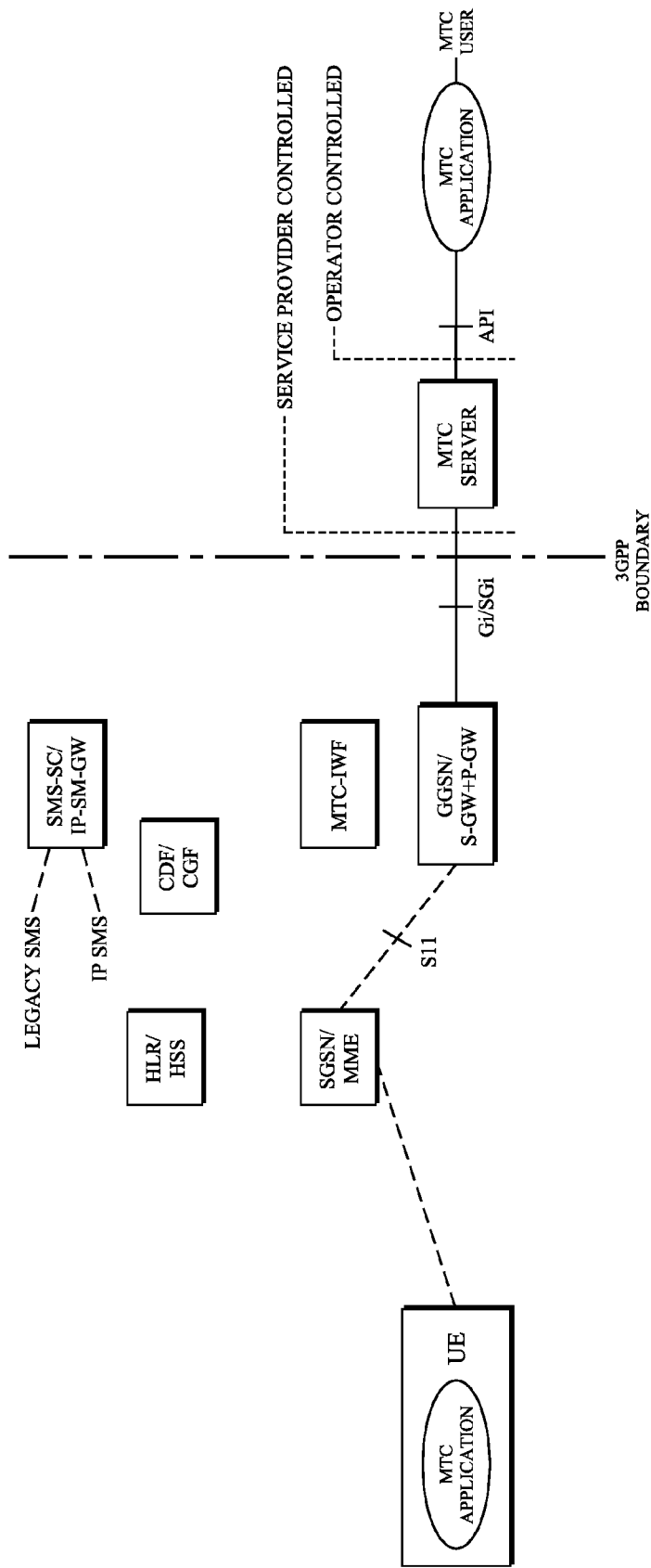

FIGS. 9A-9B illustrate schematic block diagrams of example signaling paths or network routes for one or more service classes—here service class 4—via, for example the packet core infrastructure. As shown, network messages destined for the UE/MTC device assigned to service class 4 can be routed via the GGSN/(P-GWIS-GW) interface, to the SGSN/MME interface to the UE/MTC device.

Collectively, FIGS. 7-9 illustrate various network routes or signaling paths that is can be assigned to one or more service classes. As is understood by those skilled in the art, these network routes can be interchangeable for different service classes and further, these network routes are not limited to those shown. Instead, any number of network routes using other combinations of devices/interfaces can be used. In other words, the techniques herein allow for one or more MTC devices/interfaces (e.g., the MTC server) to receive registration data from a device, determine a machine-to-machine (MTM) service class for the device base don the registration data and associate the MTM service class with at least one or more network routes. When the one or more MTC devices/interfaces receive a trigger message destined for the recently registered device, the MTC devices/interfaces can route the trigger message according to the network route associated with the MTM service class of the device.

Figure 10:
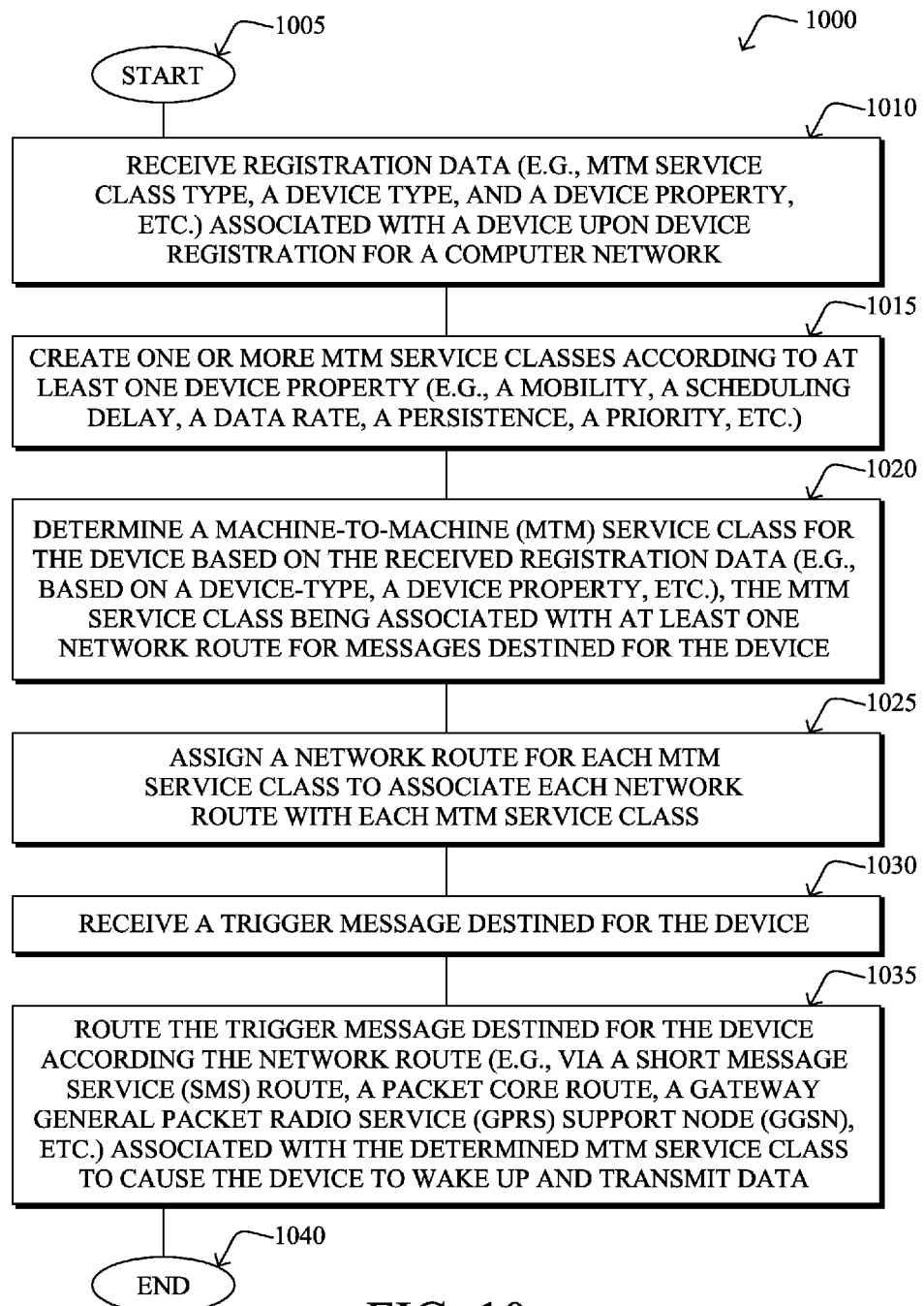
FIG. 10 illustrates an example simplified procedure for service class based message routing in the communication network.

FIG. 10 illustrates an example simplified procedure 1000 for routing messages according to a service class in a communication network (e.g., a 3GPP network) in accordance with one or more embodiments described herein, particularly from the perspective of an MTC server. The procedure 1000 may start at step 1005, and continues to step 1010, where, as described in greater detail above, the MTC server can receive registration data. Registration data can be associated with a registering device (upon registration) and can include data such as, but not limited to MTM service class type (e.g., from the registering device), a device type, a device property, a device application, etc. In step 1015, the MTC server can create one or more MTM service classes according to at least one device property (e.g., a mobility, a scheduling delay, a data rate, a persistence, a priority, an application, etc.). The MTC server, in step 1020, can further determine a machine-to-machine (MTM) service class for the device based on the received registration data (which may be associated with at least one network route) and, as discussed above, the MTC server can assign a network route for each MTM service class, as in step 1025. When the MTC server receives a trigger message, as in step 1030, the MTC server, in step 1035, can route the message destined for the device according to the assigned network route. As discussed above, the network route can include a short message service (SMS) route, a packet core route, a gateway general packet radio service (GPRS) Support node (GGSN), etc. The message, when received by the device, can further cause the device to wake up and transmit data. The procedure 1000 illustratively ends in step 1040, or may begin again at step 1010 where the MTC server receives registration data for a new device, or else step 1030 where the server receives a new message for a registered device.

It should be noted that while certain steps within procedure 1000 may be optional, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedure 1000 is described from the point of view of a particular device/interface (e.g., the MTC server), various other devices within the network may be used to execute some or all of the steps, and particular point of view (e.g., from the MTC server) is not meant to limit the scope of this disclosure.

The techniques described herein, therefore, provide delivery of messages (e.g., routing) according to a service class. In particular, the techniques herein avoid default messages routing (e.g., via SMS infrastructure delivery first, etc.) and establish service classes to efficiently route messages destined for registered devices. Such routing techniques can account for the type of MTC application, the bandwidth of the application or the device, availability of the trigger network, etc. The techniques may use such parameters to establish and assign service classes for registered devices.

While there have been shown and described illustrative embodiments that provide for trigger message routing in a communication network, it is to be understood that various other adaptations and modifications may be made within the spirit and scope of the embodiments herein. For example, the embodiments have been shown and described herein with relation to 3GPP networks. However, the embodiments in their broader sense are not as limited, and may, in fact, be used with other types of networks and/or protocols. Also, as discussed above, while the techniques generally describe determinations by an MTC server, various other interfaces/devices may also be used to provide intelligence to the network functions described herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving registration data associated with a device upon device registration for a computer network;
    creating one or more MTM service classes according to at least one device property;
    determining a machine-to-machine (MTM) service class for the device based on the received registration data, the MTM service class assigned to at least one packet core route for messages destined for the device, wherein the MTM service class is created according to one or more properties of the device, the one or more properties comprising at least one of mobility, scheduling delay, data rate, persistence or a priority;
    assigning a network route for each MTM service class to associate each network route with a corresponding one of the one or more MTM service classes, wherein the network route is assigned from group network consisting of a short message service (SMS) route and a packet core route, and wherein the packet core route includes at least one gateway General Packet Radio Service (GPRS) support node (GGSN);
    receiving a trigger message destined for the device, wherein the trigger message, once received by the device, causes the device to wake up and transmit data; and
    routing the trigger message destined for the device according to the network route that is assigned to the determined MTM service class.

2. The method as in claim 1, wherein the received registration data further comprises at least one of an MTM service class type, a device type, or a device property.

3. The method as in claim 2, wherein determining an MTM service class for the device based on the received registration data further comprises determining the MTM service class for the device based at least on one of a device type or a device property.

4. An apparatus, comprising:
    one or more network interfaces to communicate with a wide area network (WAN);
    a processor coupled to the network interfaces and adapted to execute one or more processes; and
    a memory configured to store a process executable by the processor, the process when executed operable to:
        receive registration data associated with a device upon device registration for a computer network;
        create one or more MTM service classes according to at least one device property;
        determine a machine-to-machine (MTM) service class for the device based on the received registration data, the MTM service class assigned to at least one network route for messages destined for the device, wherein the MTM service class is created according to one or more properties of the device, the one or more properties comprising at least one of mobility, scheduling delay, data rate, persistence or a priority;

assign a network route for each MTM service class to associate each network route with a corresponding one of the one or more MTM service classes, wherein in the network route is assigned from group consisting of a short message service (SMS) route and a packet core route, and wherein the packet core route includes at least one gateway General Packet Radio Service (GPRS) support node (GGSN);

receive a trigger message destined for the device, wherein the trigger message, once received by the device, causes the device to wake up and transmit data; and route the trigger message destined for the device according to the network route assigned to the determined MTM service class.

5. A method, comprising:

determining a particular machine-to-machine (MTM) service class for a device in a 3rd generation partnership project (3GPP) network, wherein the MTM service class is created according to one or more properties of the device, the one or more properties comprising at least one of mobility, scheduling delay, data rate, persistence or a priority;

registering the device according to the determined MTM service class;

receiving a trigger message at the device routed via the 3GPP network based on the MTM service class, wherein the trigger message, once received by the device, causes the device to wake up and transmit data; and transmitting data by the device in response to the received trigger message, wherein one or more MTM service classes are created according to at least one device property and a network route for each MTM service class is assigned to associate each network route with a corresponding one of the one or more MTM service classes, wherein the network route is assigned from a group consisting of a short message service (SMS) route and packet core route, and wherein the packet core route includes at least one gateway General Packet Radio Service (GPRS) support node (GGSN).

6. The method as in claim 5, wherein determining the particular MTM service class, further comprises:

transmitting a registration request message to the 3GPP network;

receiving, in response to the registration request, configuration parameters; and determining the particular MTM service class for the device based on the configuration parameters.

7. The method of claim 5, wherein the device is configured to locally store a plurality of MTM service classes, wherein the step for determining the particular MTM service class for the device based on the configuration parameters further comprises selecting the particular MTM service class from one of the stored MTM service classes.

8. An apparatus, comprising:

one or more network interfaces to communicate with a 3rd generation partnership project (3GPP) network;

a processor coupled to the network interfaces and adapted to execute one or more processes; and a memory configured to store a process executable by the processor, the process when executed operable to:

determine a particular machine-to-machine (MTM) service class for the apparatus, wherein the MTM service class is created according to one or more properties of the apparatus, the one or more properties comprising at least one of mobility, scheduling delay, data rate, persistence or a priority;

register the apparatus according to the determined MTM class;

receive a trigger message routed via the 3GPP network to the apparatus based on the MTM service class, wherein the trigger message, once received by the device, causes the Device to wake up and transmit data; and transmit data by the apparatus in response to the received trigger message, wherein one or more MTM service classes are created according to at least one device property and a network route for each MTM service class is assigned to associate each network route with a corresponding one of the one or more MTM service classes, wherein the network route is assigned from a group consisting of a short message service (SMS) route and packet core route, and wherein the packet core route included at least one gateway General Packet Radio Service (GPRS) support node (GGSN).

9. The apparatus as in claim 8, wherein the process when executed to determine the particular MTM service class, the process is further operable to:

transmit a registration request message to the 3GPP network;

receive, in response to the registration request, configuration parameters; and determine the particular MTM service class for the apparatus based on the configuration parameters.

10. The apparatus as in claim 8, wherein the memory is further configured to store a plurality of MTM service classes wherein the process when executed to determine the particular MTM service class for the apparatus based on the configuration parameters further selects the particular MTM service class from one of the stored MTM service classes.

11. A system, comprising:

a computer network configured to provide communication between network-capable devices;

at least one machine type communication (MTC) server in communication with the network and configured to execute one or more MTC applications, one or more network devices in communication with the computer network and configured to register a device, receive one or more trigger messages routed via the computer network, and transmit data in response to each received trigger message, wherein the trigger message, once received by the device, causes the device to wake up and transmit data, wherein the one or more MTC applications, when executed by the MTC server causes the server to create one or more MTM service classes according to at least one network device property, determine a particular machine-to-machine (MTM) service class for each network device, assign a network route for each MTM service class to associate each network route with each MTM service class, register the device according to the determined MTM class, and route the one or more trigger messages destined for each network device according to the corresponding MTM service class, wherein the network route is assigned from a group consisting of a short message service (SMS) route and a packet core route, wherein the packet core route includes at least one gateway General Packet Radio Service (GPRS) support node (GGSN), and wherein the MTM service class is created according to one or more properties of each network device, the one or more properties at least one of mobility, scheduling delay, data rate, persistence or priority.

* * * * *